US008214116B2

(12) United States Patent
Whitton

(10) Patent No.: US 8,214,116 B2
(45) Date of Patent: Jul. 3, 2012

(54) APPARATUS AND METHOD FOR DECREASING AN UPSHIFT DELAY IN AN AUTOMATIC TRANSMISSION

(75) Inventor: Matthew D. Whitton, Howell, MI (US)

(73) Assignee: GM Global Technology Operations LLC, Detroit, MI (US)

(*) Notice: Subject to any disclaimer, the term of this patent is extended or adjusted under 35 U.S.C. 154(b) by 1171 days.

(21) Appl. No.: 12/033,458

(22) Filed: Feb. 19, 2008

(65) Prior Publication Data
US 2009/0018735 A1 Jan. 15, 2009

Related U.S. Application Data

(60) Provisional application No. 60/949,037, filed on Jul. 11, 2007.

(51) Int. Cl.
G06F 7/00 (2006.01)
G06F 17/00 (2006.01)
G06F 19/00 (2011.01)

(52) U.S. Cl. ........................................................ 701/55
(58) Field of Classification Search .................... 701/55, 701/56; 477/107, 109, 111, 90
See application file for complete search history.

(56) References Cited

U.S. PATENT DOCUMENTS

| 5,014,573 | A | * | 5/1991 | Hunter et al. | 477/61 |
|---|---|---|---|---|---|
| 5,046,383 | A | * | 9/1991 | Butts et al. | 477/120 |
| 5,123,288 | A | * | 6/1992 | Brown et al. | 477/154 |
| 5,295,415 | A | * | 3/1994 | Abe et al. | 477/102 |
| 5,349,885 | A | * | 9/1994 | Yoshimura et al. | 477/61 |
| 5,433,676 | A | * | 7/1995 | Abe et al. | 477/109 |
| 5,441,462 | A | * | 8/1995 | Chan | 477/74 |
| 5,568,387 | A | * | 10/1996 | Andersson | 701/51 |
| 5,758,302 | A | * | 5/1998 | Schulz et al. | 701/51 |
| 6,017,291 | A | * | 1/2000 | Ailes et al. | 477/124 |
| 6,023,647 | A | * | 2/2000 | Saito et al. | 701/57 |
| 6,319,172 | B1 | * | 11/2001 | Steinmetz et al. | 477/143 |
| 6,332,860 | B1 | | 12/2001 | Hubbard et al. | |
| 6,364,811 | B1 | * | 4/2002 | Hubbard et al. | 477/143 |
| 6,368,249 | B1 | * | 4/2002 | Hubbard | 477/121 |
| 6,415,213 | B1 | * | 7/2002 | Hubbard et al. | 701/51 |
| 6,435,049 | B1 | * | 8/2002 | Janasek et al. | 74/335 |
| 6,704,638 | B2 | * | 3/2004 | Livshiz et al. | 701/102 |
| 6,885,928 | B2 | * | 4/2005 | Berglund et al. | 701/51 |
| 7,056,263 | B2 | | 6/2006 | Whitton | |
| 7,147,588 | B2 | * | 12/2006 | Yu | 477/78 |
| 7,212,898 | B2 | * | 5/2007 | Whitton et al. | 701/51 |
| 7,214,163 | B2 | * | 5/2007 | Jeon | 477/109 |
| 7,247,126 | B2 | * | 7/2007 | Shim et al. | 477/148 |
| 7,285,073 | B2 | * | 10/2007 | Iriyama | 477/110 |

(Continued)

*Primary Examiner* — John Nguyen
*Assistant Examiner* — Michael Whalen
(74) *Attorney, Agent, or Firm* — Quinn Law Group, PLLC

(57) ABSTRACT

A method reduces a time delay or lag between a commanded upshift and a resultant upshift event in vehicle. The method detects the commanded upshift, calculates a scheduled engine torque reduction torque value as a function of an unmanaged torque, and reduces an input torque value from the engine using the calculated scheduled torque. A powertrain includes an engine, a transmission, a torque converter, clutches that are selectively engageable to provide at least six forward speed ratios, a reverse speed ratio, and a neutral condition, and a controller. The controller has an algorithm controlling an operation of an off-going clutch and the on-coming clutch during a speed ratio change representing an upshift event. The algorithm calculates a scheduled torque value as a percentage of an unmanaged torque level of the engine, and controls the off-going and on-coming clutch through the speed ratio change using the calculated scheduled torque value.

14 Claims, 4 Drawing Sheets

U.S. PATENT DOCUMENTS

| | | | |
|---|---|---|---|
| 7,292,922 B2 * | 11/2007 | Chen et al. | 701/51 |
| 7,335,132 B2 * | 2/2008 | Yeo | 477/109 |
| 7,503,875 B2 * | 3/2009 | Fujii et al. | 477/107 |
| 7,524,264 B2 * | 4/2009 | Hayashi et al. | 477/78 |
| 7,651,440 B2 * | 1/2010 | Runde | 477/143 |
| 7,762,925 B2 * | 7/2010 | Dickinson | 477/109 |
| 2003/0224906 A1 * | 12/2003 | Monowa et al. | 477/121 |
| 2004/0002805 A1 * | 1/2004 | Livshiz et al. | 701/102 |
| 2004/0116250 A1 * | 6/2004 | Whitton | 477/143 |
| 2004/0192500 A1 * | 9/2004 | Tokura et al. | 477/109 |
| 2004/0260443 A1 * | 12/2004 | Berglund et al. | 701/51 |
| 2005/0124460 A1 * | 6/2005 | Iriyama | 477/107 |
| 2005/0143218 A1 * | 6/2005 | Yu | 477/65 |
| 2006/0178244 A1 * | 8/2006 | Whitton et al. | 477/181 |
| 2006/0234830 A1 * | 10/2006 | Iriyama et al. | 477/109 |
| 2007/0173374 A1 * | 7/2007 | Hayashi | 477/78 |
| 2008/0051254 A1 * | 2/2008 | Satou et al. | 477/109 |
| 2008/0081735 A1 * | 4/2008 | Runde | 477/107 |
| 2008/0156552 A1 * | 7/2008 | Dickinson | 180/65.2 |
| 2008/0275612 A1 * | 11/2008 | Vesenjak | 701/54 |
| 2009/0018735 A1 * | 1/2009 | Whitton | 701/55 |
| 2009/0156356 A1 * | 6/2009 | Jiang | 477/86 |
| 2009/0319140 A1 * | 12/2009 | Sato et al. | 701/55 |
| 2009/0325760 A1 * | 12/2009 | Soliman et al. | 477/98 |
| 2009/0326778 A1 * | 12/2009 | Soliman et al. | 701/84 |
| 2010/0274456 A1 * | 10/2010 | Kondo et al. | 701/69 |
| 2010/0318269 A1 * | 12/2010 | Yanakiev et al. | 701/55 |
| 2011/0054752 A1 * | 3/2011 | Arai | 701/67 |
| 2011/0106356 A1 * | 5/2011 | Tsuda et al. | 701/22 |

* cited by examiner

APPARATUS AND METHOD FOR DECREASING AN UPSHIFT DELAY IN AN AUTOMATIC TRANSMISSION

CLAIM OF PRIORITY

This application claims priority to U.S. Provisional Patent Application No. 60/949,037, filed on Jul. 11, 2007, which is hereby incorporated by reference in its entirety.

TECHNICAL FIELD

The present invention relates to a method and apparatus for optimizing the responsiveness of a shift event in an automatic transmission by decreasing a delay in the initiation of a commanded upshift according to a calculated or ramped requested clutch torque.

BACKGROUND OF THE INVENTION

An automatic transmission for a motor vehicle generally includes a number of gear elements coupling an input and output shaft, and a number of torque-transmitting devices that are selectively engageable to thereby activate certain gear elements, thus establishing a desired speed ratio between the input and output shafts. As used herein, the term "torque-transmitting device" will be used collectively to refer to brakes as well as rotating clutches.

The transmission input shaft is typically connected to a vehicle engine or another vehicle power source through a fluid coupling device such as a torque converter. A torque converter includes a turbine (the "driven" member), a pump (the "driving" member), and a stator (the "stationary" member), and the output shaft is connected directly to the vehicle wheels for propelling the vehicle. Shifting from one forward speed ratio to another is performed in response to engine throttle level and vehicle speed, and generally involves releasing or disengaging a clutch associated with the current speed ratio, i.e., the off-going clutch, and applying or engaging a clutch associated with a desired new speed ratio, i.e., the on-coming clutch.

The term "speed ratio" is defined herein as the transmission input speed or torque converter turbine speed divided by the transmission output speed. Thus, a low gear range has a high speed ratio while a high gear range has a lower speed ratio. A shift made from a high speed ratio to a lower speed ratio is referred to commonly as an "upshift". In the type of transmission involved within the scope of this invention, an upshift is accomplished by disengaging a clutch associated with the higher speed ratio and engaging a clutch associated with the lower speed ratio to thereby reconfigure the gear set to operate at the lower speed ratio. Shifts performed in the above manner are termed "clutch-to-clutch" shifts, and require precise timing in order to achieve optimal quality shifting, and to reduce a perceptible delay in the upshift event.

Conventional transmissions typically use various compliance devices such as accumulators, wave plates, and orifices, as well as hydraulic line pressure, to control the shift event. The quality of a particular shift event, and in particular the minimization of a delay in executing an upshift, depends on cooperative operation of several different clutch functions, such as pressure changes within on-coming and off-going clutch apply chambers, and the timing of control of the various compliance devices.

In clutch-to-clutch systems, single clutches may perform multiple clutch functions. For example, one clutch may handle low torque, closed-throttle downshifts while remaining capable of handling a high torque upshift. Moreover, clutches are designed to meet requirements for durability, packaging, and different shifting scenarios. This balance in clutch-to-clutch systems may lead to less than optimal hardware utilization for certain clutch maneuvers. A high torque upshift may require rapid pressurization or fill of the clutch chamber while overcoming compliance to rapidly initiate a desired speed ratio change, which in some circumstances may lead to less than optimal upshift delays.

SUMMARY OF THE INVENTION

Accordingly, a method is provided for reducing an upshift delay in an automatic transmission by calculating a reduced level of input torque, engine reduction torque, or a scheduled torque value, at which an on-coming clutch may initiate a speed ratio change within a predetermined and reduced threshold time period, thereby optimizing the upshift response time.

The method includes detecting a commanded upshift, calculating the scheduled torque value as a function of an unmanaged torque value in response to the commanded upshift, and reducing an input torque value from the engine using the calculated scheduled torque value rather than the unmanaged torque value. The calculated scheduled torque value is then passed into model-based controls in order to complete the upshift event.

The method also includes determining a target percentage level of torque reduction of the engine torque, a target time by which to achieve the target level of torque reduction, and the speed of a turbine portion of the torque converter. The scheduled torque value is then calculated using the unmanaged torque value, the speed of the turbine, the target percentage level of torque reduction, and the target time. The target percentage of torque reduction and the target time are determined by accessing a lookup table indexed by the speed of the turbine and the unmanaged torque value.

An input acceleration trajectory of the turbine is measured at the start of the torque phase of the upshift event, and the method includes calculating an output torque trajectory of an output shaft of the automatic transmission, and an on-coming torque level for controlling the on-coming clutch during the torque phase using the scheduled torque value. The method also includes calculating an off-going torque level of the off-going clutch required for controlling the off-going clutch during the torque phase using the scheduled torque value, with the on-coming and off-going torque levels being calculated using an equation that is a function of the scheduled torque value, the output torque trajectory of the automatic transmission, and the measured acceleration of the turbine portion of the torque converter.

An output acceleration trajectory of the turbine at the completion of the torque phase of the upshift event is calculated, the output acceleration trajectory describing a required turbine acceleration trajectory for the inertia phase. The method includes calculating a desired turbine acceleration trajectory representing the desired turbine acceleration trajectory for the entire speed ratio change of the upshift event, and calculates a desired engine torque that is required through a speed ratio change of the upshift event. A desired engine torque is calculated as a function of the output torque trajectory, the desired turbine acceleration trajectory, and the output acceleration trajectory.

The method further includes buffering the desired engine torque and the desired turbine acceleration trajectory in order to compensate for a predetermined time lag representing a known delay in delivering an input torque from the transmission to the clutch assembly.

A method is provided for reducing a time delay between a commanded upshift and a resultant upshift event in a vehicle having an engine, an automatic transmission, a torque converter, an off-going clutch, and an on-coming clutch. The method includes detecting a commanded speed ratio change corresponding to an upshift event, calculating a scheduled torque value as a percentage reduction of an unmanaged torque level in response to the commanded speed ratio change, and calculating an on-coming torque value for the on-coming clutch and an off-going torque value for the off-going clutch during a torque phase of the upshift event using the scheduled engine reduction torque. The on-coming and off-going clutches are then applied during the torque phase using the respective calculated on-coming and off-going torque values.

A vehicle powertrain is also provided that is controllable using the method described above. The powertrain has an engine, a transmission having an input shaft, and a torque converter providing a fluid coupling between the engine and the transmission input shaft. The powertrain also includes a controller and a plurality of clutches that are selectively engageable to provide at least six forward speed ratios, a reverse speed ratio, and a neutral condition. The controller is configured to include an algorithm for controlling an operation of an off-going clutch and the on-coming clutch of the plurality of clutches during a speed ratio change representing an upshift event, with the algorithm being configured for calculating a scheduled torque value as a percentage of an unmanaged torque level of the engine, and for controlling the operation of the off-going and the ongoing clutch through the speed ratio change using the calculated scheduled torque value. The plurality of clutches includes at least a first, a second, a third, a fourth, and a fifth clutch.

The above objects, features and advantages, and other objects, features and advantages of the present invention are readily apparent from the following detailed description of the best mode for carrying out the invention when taken in connection with the accompanying drawings.

DESCRIPTION OF THE PREFERRED EMBODIMENT

Figure 1:
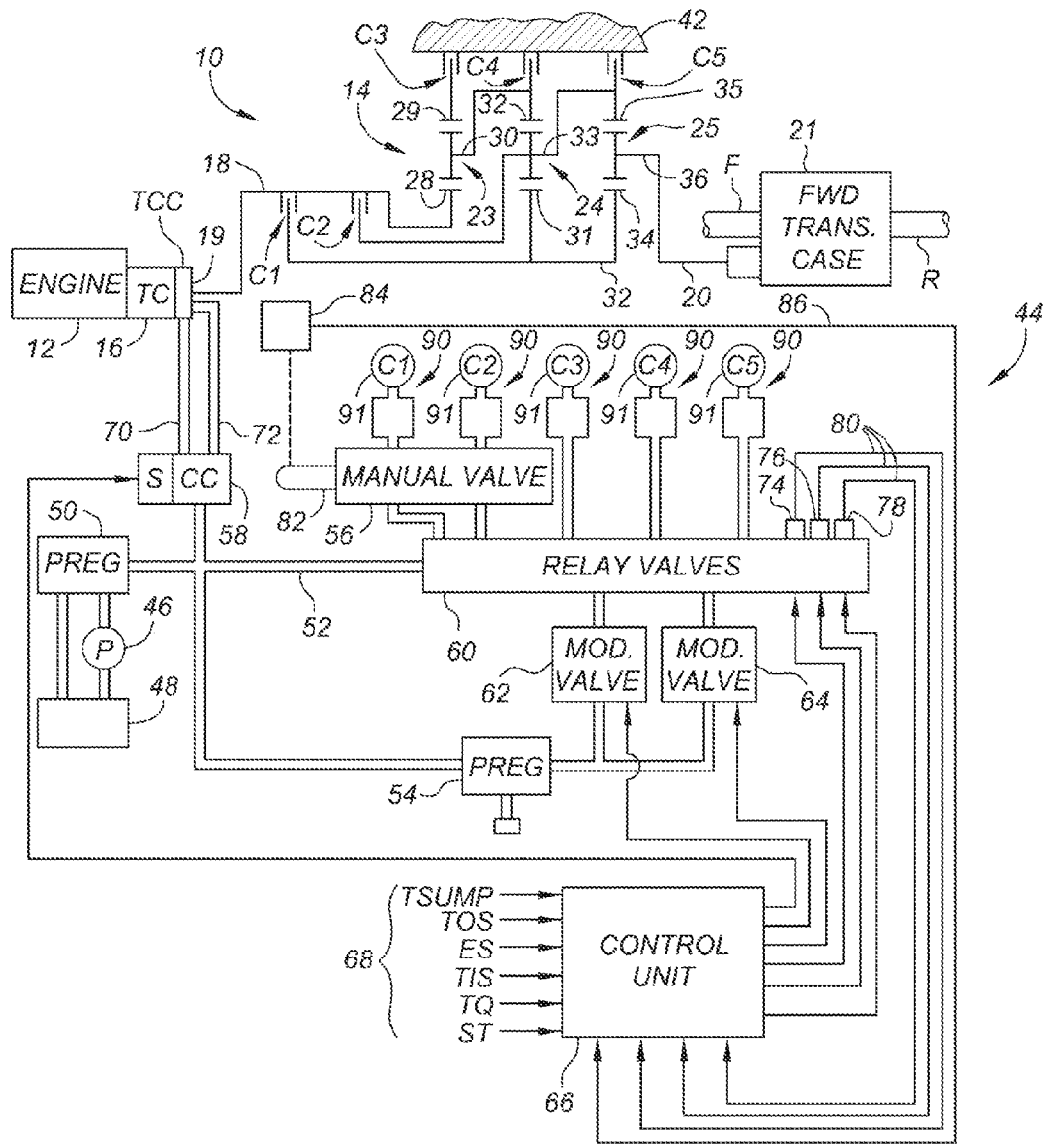
FIG. 1 is a schematic illustration of an automatic transmission usable with the invention.

Referring to FIG. 1, the reference numeral 10 generally designates a preferred vehicle power train including an engine 12, a transmission 14, and a torque converter 16 (TC) providing a fluid coupling between engine 12 and a transmission input shaft 18. While the invention will be described as being used with a conventional engine 12, alternate power sources such as an electric motor or hybrid electric/gas motor may be implemented as well within the scope of the invention. Engine output may be controlled as necessary to change an actual value of an input torque to transmission 14 as needed to calculate an optimal value of transmission input torque, as explained below with reference to FIG. 3. A reduction of engine torque may be accomplished, for example, by controlled spark arrest, and an increase of engine torque is accomplished by opening the throttle. It should be appreciated, however, that there are numerous methods for increasing and/or decreasing engine torque, as will be understood by those of ordinary skill in the art.

A torque converter clutch 19 (TCC) is selectively engaged under certain conditions to provide a mechanical coupling between the engine 12 and the transmission input shaft 18. A transmission output shaft 20 is coupled to the driving wheels of the vehicle (not shown) in one of several conventional ways. The illustrated embodiment depicts a four-wheel-drive (FWD) application in which the output shaft 20 is connected to a transfer case 21 that is also coupled to a rear drive shaft R and a front drive shaft F. Typically, the transfer case 21 is manually shiftable to selectively establish one of several drive conditions, including various combinations of two-wheel-drive and four-wheel drive, and high-speed or low-speed range, with a neutral condition occurring intermediate to the two-wheel and four-wheel drive conditions.

The transmission 14 has three inter-connected planetary gear sets, designated generally by the reference numerals 23, 24, and 25. Planetary gear set 23 includes a sun gear member 28, a ring gear member 29, and a planet carrier assembly 30. A planet carrier assembly 30 includes a plurality of pinion gears rotatably mounted on a carrier member and disposed in meshing relationship with both sun gear member 28 and ring gear member 29. Planetary gear set 24 includes a sun gear member 31, a ring gear member 32, and a planet carrier assembly 33. A planet carrier assembly 33 includes a plurality of pinion gears rotatably mounted on a carrier member and disposed in meshing relationship with both a sun gear member 31 and a ring gear member 32. Planetary gear set 25 includes a sun gear member 34, a ring gear member 35, and a planet carrier assembly 36. The planet carrier assembly 36 includes a plurality of pinion gears rotatably mounted on a carrier member and disposed in meshing relationship with both the sun gear member 34 and a ring gear member 35.

The input shaft 18 continuously drives the sun gear 28 of gear set 23, selectively drives the sun gears 31, 34 of gear sets 24, 25 via the clutch C1, and selectively drives the carrier 33 of gear set 24 via the clutch C2. The ring gears 29, 32, 35 of the gear sets 23, 24, 25 are selectively connected to a stationary member or ground 42 via the clutches (i.e., brakes) C3, C4 and C5, respectively.

The state of the clutches C1-C5 (i.e., engaged or disengaged) can be controlled to provide at least six forward speed ratios (1, 2, 3, 4, 5, 6), a reverse speed ratio (R) or a neutral condition (N). For example, the first forward speed ratio is achieved by engaging clutches C1 and C5. Downshifting from one forward speed ratio to another is generally achieved by disengaging one clutch (referred to as the off-going clutch) while engaging another clutch (referred to as the on-coming clutch). For example, the transmission 14 is downshifted from second to first by disengaging clutch C4 while engaging clutch C5.

The torque converter clutch 19 and the transmission clutches C1-C5 are controlled by an electro-hydraulic control system, generally designated by reference numeral 44. The hydraulic portions of the control system 44 include a pump 46 (P) which draws hydraulic fluid from a reservoir 48, a pressure regulator 50 which returns a portion of the pump output to reservoir 48 to develop a regulated pressure in line 52, a secondary pressure regulator valve 54, a manual valve 56 manipulated by the driver of the vehicle, and a number of solenoid-operated fluid control valves 58, 60, 62 and 64.

The electronic portion of the electro-hydraulic control system 44 is primarily embodied in the transmission control unit or a controller 66, which is microprocessor-based and conventional in architecture. The controller 66 controls the solenoid-operated fluid control valves 58-64 based on a number of inputs 68 to achieve a desired transmission speed ratio. Such inputs include, for example, signals representing the transmission input speed TIS, engine speed ES, the shift type ST (for example, a 1-2 upshift), a driver torque command TQ, the transmission output speed TOS, and the hydraulic fluid temperature Tsump. Sensors for developing such signals may be conventional in nature, and have been omitted for simplicity.

The control lever 82 of manual valve 56 is coupled to a sensor and display module 84 that produces a diagnostic signal on line 86 based on the control lever position; such signal is conventionally referred to as a PRNDL signal, since it indicates which of the transmission ranges (P, R, N, D or L) has been selected by the vehicle driver. Finally, fluid control valves 60 are provided with pressure switches 74, 76, 78 for supplying diagnostic signals to controller 66 on lines 80 based on the respective relay valve positions. The controller 66, in turn, monitors the various diagnostic signals for the purpose of electrically verifying proper operation of the controlled elements.

The solenoid-operated fluid control valves 58-64 are generally characterized as being either of the on/off or modulated type. To reduce cost, the electro-hydraulic control system 44 is configured to minimize the number of modulated fluid control valves, as modulated valves are generally more expensive to implement. To this end, fluid control valves 60 are a set of three on/off relay valves, shown in FIG. 1 as a consolidated block, and are utilized in concert with manual valve 56 to enable controlled engagement and disengagement of each of the clutches C1-C5. Valves 62, 64 are of the modulated type. For any selected ratio, the controller 66 activates a particular combination of relay valves 60 for coupling one of the modulated valves 62, 64 to the on-coming clutch, and the other one of the modulated valves 62, 64 to the off-going clutch.

The modulated valves 62, 64 each comprise a conventional pressure regulator valve biased by a variable pilot pressure that is developed by current controlled force motors (not shown). Fluid control valve 58 is also a modulated valve, and controls the fluid supply path to converter clutch 19 in lines 70, 72 for selectively engaging and disengaging the torque converter clutch 19. The controller 66 determines pressure commands for smoothly engaging the on-coming clutch while smoothly disengaging the off-going clutch to shift from one speed ratio to another, develops corresponding force motor current commands, and then supplies current to the respective force motors in accordance with the current commands. Thus, the clutches C1-C5 are responsive to the pressure commands via the valves 58-64 and their respective actuating elements (e.g., solenoids, current-controlled force motors).

As indicated above, each shift from one speed ratio to another includes a fill or preparation phase during which an apply chamber 91 of the on-coming clutch is filled in preparation for torque transmission. Fluid supplied to the apply chamber compresses an internal return spring (not shown), thereby stroking a piston (not shown). Once the apply chamber is filled, the piston applies a force to the clutch plates, developing torque capacity beyond the initial return spring pressure. Thereafter, the clutch transmits torque in relation to the clutch pressure, and the shift can be completed using various control strategies. The usual control strategy involves commanding a maximum on-coming clutch pressure for an empirically determined fill time, and then proceeding with the subsequent phases of the shift. The volume of fluid required to fill an apply chamber and thereby cause the clutch to gain torque capacity is referred to as the "clutch volume."

The controller 66 determines the timing of the pressure commands based on an estimated on-coming clutch volume, i.e., an estimated volume of fluid required to fill the on-coming clutch apply chamber and thereby cause the on-coming clutch to gain torque capacity. An estimated on-coming clutch volume must be used because the actual on-coming clutch volume may vary over time as a result of wear, and may vary from transmission to transmission because of build variations and tolerances.

The controller 66 also calculates an estimated volume of fluid supplied to the on-coming clutch apply chamber as the chamber is being filled based on a mathematical model of the transmission hydraulic system, and compares the estimated volume of fluid supplied to the estimated clutch volume. In a preferred embodiment, the controller 66 subtracts the estimated volume of fluid supplied from the estimated clutch volume to determine an estimated clutch volume remaining. If the controller is accurate, the estimated clutch volume remaining will be zero at the time the on-coming clutch gains torque capacity.

Figure 1A:
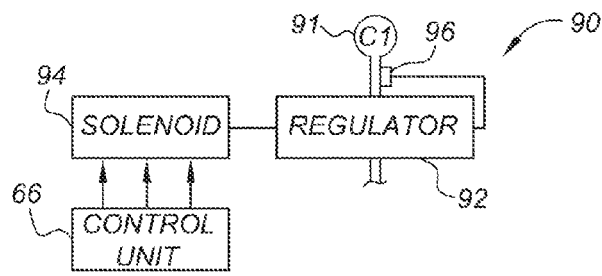
FIG. 1a is a schematic illustration of a valve portion of FIG. 1.

Alternatively, instead of the modulated valves 62, 64 and the relay valves 60, the transmission may include a plurality of individual control valves each operatively connected to a respective apply chamber 91. Referring to FIG. 1a, an exemplary fluid control valve 90 includes a regulator 92, a solenoid 94 and a pressure sensor 96. Each control valve 90 is configured to provide fluid to the apply chamber 91 of its respective clutch C1-C5 at either a full feed state or a regulating state.

Figure 4:
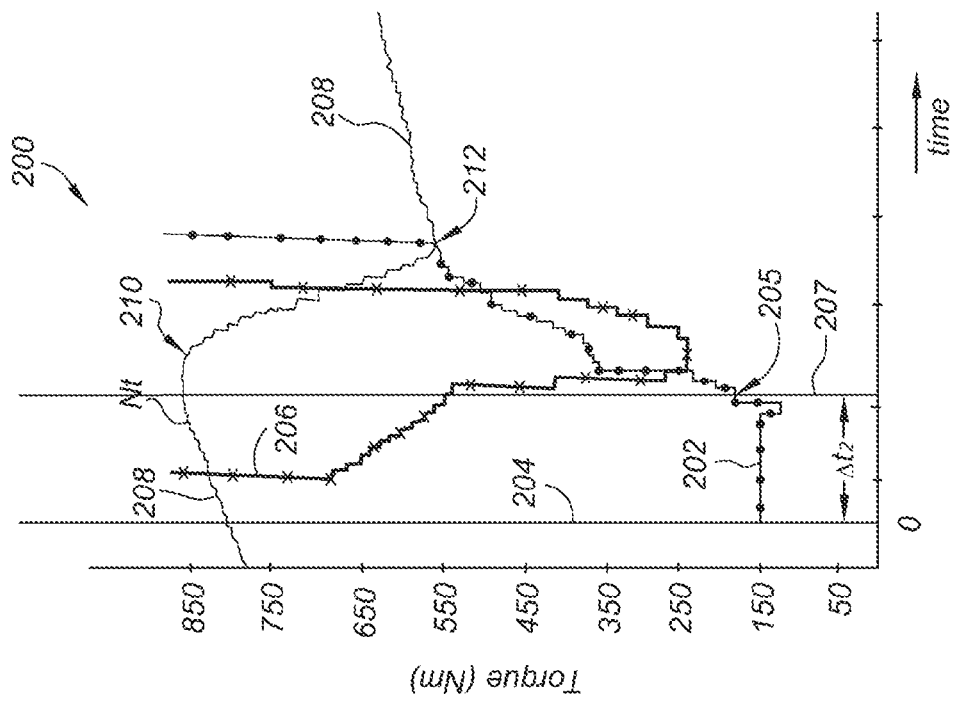
FIG. 4 is a graphical depiction of an off-going clutch command, an on-coming clutch command, and a requested torque value during an optimized upshift according to the invention.
Figure 2:
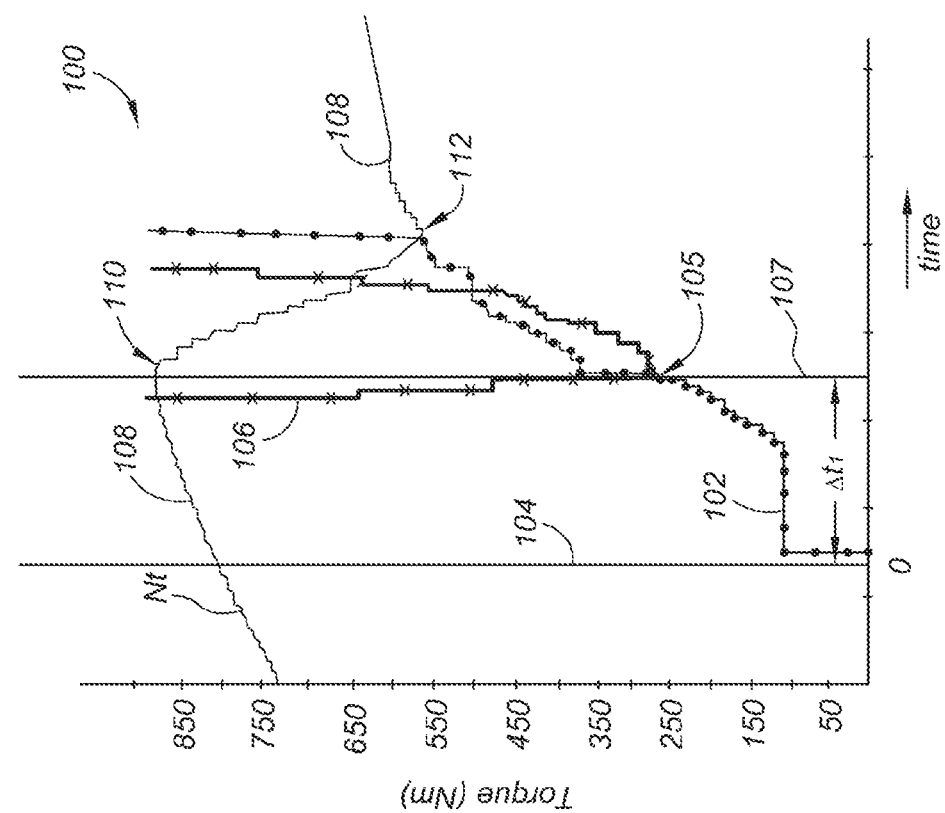
FIG. 2 is a graphical depiction of an off-going clutch command, an on-coming clutch command, and a requested torque value during a typical upshift event.

Referring to FIG. 2, a representative set of clutch control curves 100 describes the relative performance of various components of a typical powertrain. Line 104 represents the start of an upshift event, i.e., the point in time at which a vehicle operator commands or otherwise signals for an upshift to occur. Line 107, and more particularly the point 105, represents the time at which a clutch is filled or pressurized to a sufficient level for establishing a clutch pressure that is capable of "pulling down" or reducing a turbine speed (Nt). The turbine speed (Nt), also represented by the curve 108, is the rotational speed of a turbine portion of a torque converter, such as the torque converter 16 of FIG. 1, which must be reduced to initiate the upshift event that was previously commanded at line 104. The turbine speed (Nt) shown in FIGS. 2 and 4 are representative, and do not correspond to the torque units demarked on the Y-axis of those two figures.

The distance between the commanded upshift of line 104 and the start of shift at line 107 (point 105) represents a lag or delay in time between the actual upshift command, such as a gear shift maneuver or "tap", and the initiation of the commanded shift event within the transmission 14 (see FIG. 1), with the delay being abbreviated $\Delta t_1$ for simplicity. The turbine speed (Nt) represented by curve 108 peaks at a speed point generally indicated by arrow 110, which approximately corresponds to the start point of the upshift event. The turbine speed (Nt) then rapidly decreases to a minimum turbine speed point as generally indicated by arrow 112, which corresponds to an approximate end point for the commanded upshift event initiated at the time indicated by line 107.

In other words, the speed point indicated generally by the arrow 112 is the point in time at which a clutch pressure corresponding to the on-coming clutch torque, represented by curve 102, ramps to a sufficient level for "pulling down" the unmanaged engine or turbine torque value (curve 106). As used herein, the term "unmanaged torque level" refers to a torque value at which the engine 12 (see FIG. 1) would normally operate in the absence of any commanded spark retardation, i.e., the non-retarded engine torque value. It is therefore desirable to reduce or shorten the time delay ($\Delta t_1$) explained previously hereinabove, and to thereby minimize or eliminate any perceptible lag in the shift response, by calculating a scheduled engine torque reduction, referred to hereinafter as a "scheduled torque value" for simplicity and represented as curve 206 of FIG. 4. The scheduled torque value is a calculated portion or percentage of the unmanaged torque (curve 106), and controls the input torque transmitted from the engine 12 to the transmission 14 (see FIG. 1) as an alternative to using the unmanaged engine torque value (curve 106) in the conventional manner. An upshift event is then executed in a particular manner using this calculated scheduled torque value (curve 206 of FIG. 4) as a primary control parameter, with the upshift event being initiated at a predetermined speed that is lower than a speed determined using the unmanaged torque value (curve 106).

Figure 3:
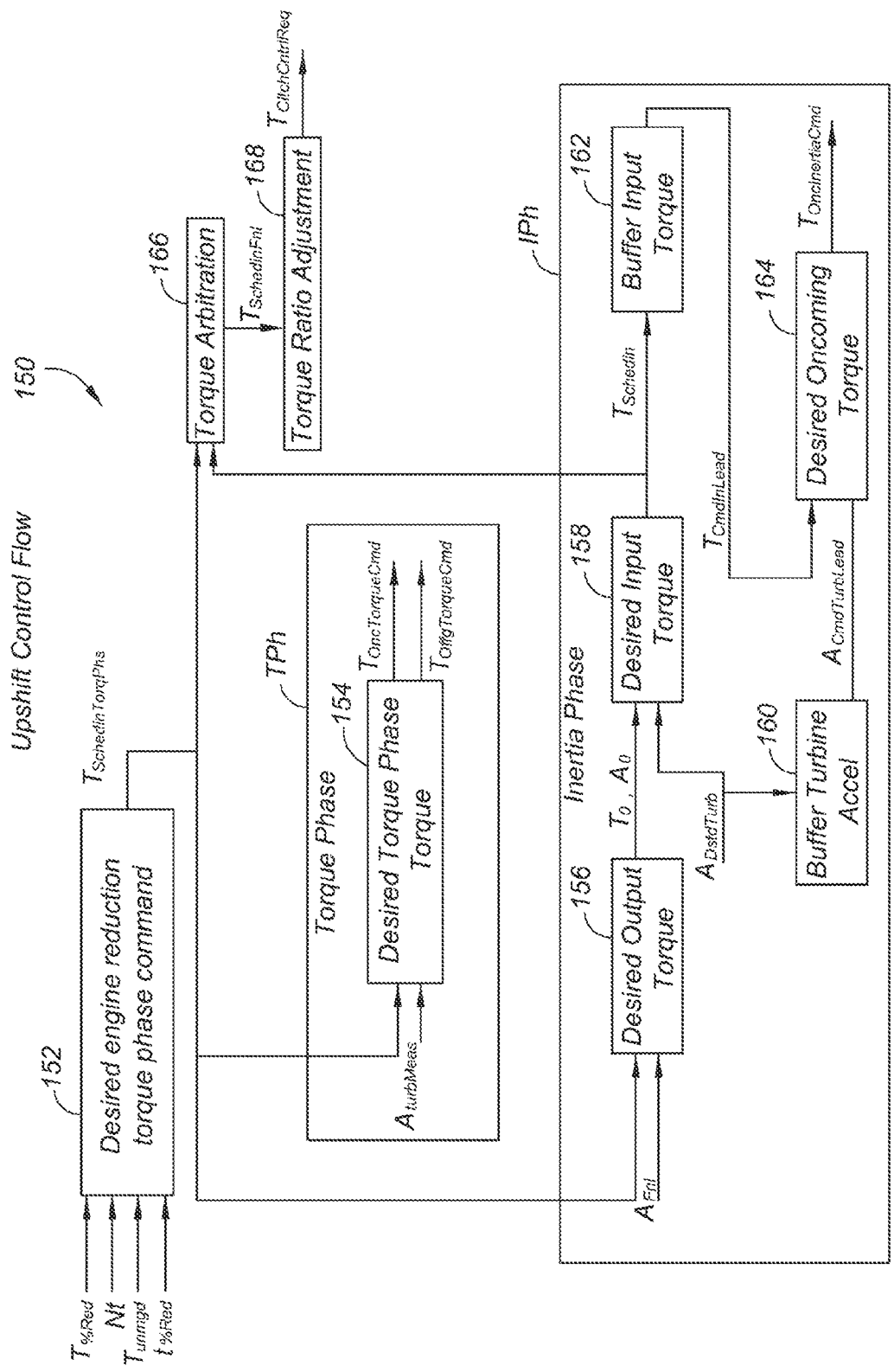
FIG. 3 is a graphical flow chart illustrating a method of reducing a delay in an upshift event.

Referring to FIG. 3, a clutch control method or algorithm 150 completes the upshift event using a model-based approach based on the calculated scheduled torque value (curve 206 of FIG. 4), in which the engine/input torque is reduced in a controlled manner to thereby reduce the commanded clutch pressure required for an upshift event. The algorithm 150 shortens or reduces the time delay $\Delta t_1$ (see FIG. 2) that may be experienced between a commanded upshift and the onset of the upshift event. The algorithm 150 is preferably programmed into or otherwise recorded or stored for ready access by the controller 66 (see FIG. 1). As those of ordinary skill in the art will recognize, to perform an upshift event efficiently, the upshift can be commanded at a precise or target engine speed. For example, one may use the familiar "redline" of a vehicle tachometer as a shift target. In reality, however, one still must account for any inherent upshift delay, i.e., $\Delta t_1$ as described above, in timing a commanded upshift.

Beginning with step 152 of algorithm 150, the controller 66 (see FIG. 1) looks ahead at an impending upshift event, such as by detecting or otherwise determining a commanded shift. The algorithm 150 then calculates or otherwise determines the scheduled torque request, abbreviated $T_{SchedInTorqPhs}$ in FIG. 3 for simplicity, for use in controlling the engine/input torque and the on-coming and off-going clutch torques contributing to the upshift event. As discussed above, the scheduled torque request ($T_{SchedInTorqPhs}$) corresponds to curve 206 of the series of control curves 200 shown in FIG. 4 and described below. At step 152, in one embodiment the algorithm 150 determines a target percentage level of torque reduction, abbreviated $T_{\% \, Red}$ in FIG. 3; and a calibrated, desired, or target time, abbreviated $t_{\% \, Red}$ in FIG. 3, by which to achieve the target percentage level of torque reduction ($T_{\% \, Red}$). The algorithm 150 then uses two performance measurements or values in calculating the scheduled torque request ($T_{SchedInTorqPhs}$): (1) the present or start-of-shift turbine speed (Nt), which may be measured at the engine 12 (see FIG. 1) or at the turbine portion of the torque converter 16 (see FIG. 1), and (2) the baseline or unmanaged torque value described hereinabove, and abbreviated $T_{Unmgd}$ in FIG. 3.

At step 152, the algorithm 150 determines the target time ($t_{\% \, Red}$) and the target percentage level of torque reduction ($T_{\% \, Red}$) by, for example, accessing a calibrated lookup table. The scheduled torque value ($T_{SchedInTorqPhs}$) is then determined or calculated as a function of both the turbine speed (Nt) and of the unmanaged torque ($T_{Unmgd}$) required for achieving the target percentage level of torque reduction ($T_{\% \, Red}$) of the engine 12 (see FIG. 1), within the target time ($t_{\% \, Red}$). The resultant calculated scheduled torque value ($T_{SchedInTorqPhs}$) is a percentage reduction of the unmanaged torque ($T_{Unmgd}$) described above. It is this alternate and calculated scheduled torque value ($T_{SchedInTorqPhs}$) that is used as the primary input into the remainder of the steps of the algorithm 150, as an input into model-based clutch controls described below. After calculating the scheduled torque value ($T_{SchedInTorqPhs}$), the algorithm 150 proceeds to step 154.

At step 154, which is shown in FIG. 3 within the torque phase box labeled "TPh", the algorithm 150 next calculates a desired on-coming torque level, abbreviated $T_{OncTorqueCmd}$ for simplicity, and an off-going torque level, likewise abbreviated $T_{OffgTorqueCmd}$, for use in controlling clutch operation during the torque phase of the upshift, i.e., the duration of the shift event during which on-coming clutch pressure is increased to a sufficient level to initiate the "pull down" of the turbine speed (Nt) discussed above. The scheduled input torque ($T_{SchedInTorqPhs}$) calculated at step 152, as well as a measured turbine acceleration ($A_{TurbMeas}$) taken at the start of the torque phase, are used as inputs to step 154. Appropriate on-coming and off-going torque values, i.e., $T_{OncTorqueCmd}$ and $T_{OffgTorqueCmd}$, respectively, are then calculated.

Generally, a transmission shift control method usable with the invention would employ known off-going torque ($T_{OffgTorqueCmd}$) and on-coming torque ($T_{OncTorqueCmd}$) equations. For example:

$$(T_{OffgTorqueCmd}) = a(T_o) + b(T_{SchedInTorqPhs}) + c(A_{turbMeas})$$

$$(T_{OncTorqueCmd}) = d(T_o) + e(T_{SchedInTorqPhs}) + f(A_{turbMeas})$$

These equations determine the clutch torque values that are necessary to achieve a desired output torque trajectory for a given input torque and turbine acceleration. In the equations, the value "To" represents the output torque trajectory or profile of the transmission output shaft 20 (see FIG. 1). The value "$T_{SchedInTorqPhs}$" is the scheduled torque, and the value "$A_{turbMeas}$" is the input shaft acceleration trajectory or profile. The values a, b, c, d, e, and f are theoretical constants for each shift type (i.e., on or off), which will vary depending on the particular transmission that is used, as will be understood by those of ordinary skill in the art. These calculated values are then used to control clutch operation during the torque phase of the upshift event. Also as will be understood by those of ordinary skill in the art, the respective calculated torque values may be readily converted to corresponding clutch pressures by the controller 66 (see FIG. 1), which in turn are used by the various valves, such as PREG 50, 54 and MOD VALVE 62, 64 (see FIG. 1), to properly control clutch operation.

During clutch slip when the off-going clutch torque is optimally zero, the inertia phase (abbreviated IPh) of the upshift event is entered. The scheduled amount of engine torque reduction, or the scheduled torque value ($T_{SchedInTorqPhs}$) previously calculated or determined at step 152 is used as an input value at step 156 of the inertia phase, along with the final acceleration of the turbine of torque converter 16 (see FIG. 1) as measured or determined at the end of the torque phase, and abbreviated $A_{Final}$ herein.

At step 156, the algorithm 150 calculates or determines a required transmission output torque ($T_o$) trajectory or profile, as well as an output trajectory or profile for the output acceleration ($A_o$) through the entire inertia phase (IPh) of the upshift. The algorithm 150 then proceeds to step 158.

At step 158, the output values of the profiles for output torque ($T_o$) and output acceleration ($A_o$) determined at step 156 are used as input values for determining a desired engine or input torque, i.e., an engine/input torque that is required through the speed ratio change occurring during the upshift. An additional input to step 158 is the desired turbine acceleration profile ($A_{DsrdTurb}$) i.e., the trajectory or profile of the desired turbine acceleration taken through the entire impending speed ratio change. Step 158 calculates or otherwise determines a scheduled engine/input torque ($T_{SchedIn}$) i.e., a level of input torque required during the commanded speed ratio change to meet the ultimate shift time command and the output torque requirements, and proceeds to step 160.

At step 160, the desired turbine acceleration value ($A_{DsrdTurb}$)(see step 158) is buffered to compensate for the known or stored delay or time lag of delivering the input torque from the transmission 14 (see FIG. 1). This buffered input torque value ($T_{CmdInLead}$) is then used as an input at step 164.

At step 162, the desired scheduled input torque ($T_{SchedIn}$) (see step 158) is buffered to compensate for the known or stored delay or time lag of delivering a generated torque from the engine 12 (see FIG. 1) to the input shaft 18 (see FIG. 1). This buffered value ($T_{CmdTurbLead}$) is then relayed to step 164.

At step 164, the buffered acceleration profile output of step 160, ($A_{CmdTurbLead}$) and the buffered output of step 162 ($T_{CmdInLead}$), are used by the controller 66 to calculate the on-coming torque used during the inertia phase ($T_{OncInertiaCmd}$) of the upshift.

At steps 166 and 168, the input or engine torque required for execution of the upshift is then determined. At step 166, the requested or scheduled torque request ($T_{SchedInTorqPhs}$) determined at step 152 is arbitrated against or compared to the scheduled input torque ($T_{SchedIn}$) determined at step 158. Arbitration step 166 compares the values of $T_{SchedInTorqPhs}$ and $T_{SchedIn}$, and selects the lower of the two values as the arbitrated value ($T_{SchedFinal}$). Algorithm 150 then proceeds to step 168.

At step 168, the arbitrated value ($T_{SchedFinal}$) determined at step 166 is adjusted as needed to account for the specific torque ratio of torque converter 16 (see FIG. 1), and to thereby calculate or determine a final torque request ($T_{CltchCntrlReq}$). The final torque request ($T_{CltchCntrlReq}$) is usable by the controller 66 (see FIG. 1) in controlling the upshift event, that is, the controller 66 may use the calculated final torque request ($T_{CltchCntrlReq}$) to determine an appropriate spark request for controlling the engine 12 (see FIG. 1) to reduce engine torque to the level of the calculated final torque request ($T_{CltchCntrlReq}$).

Figure 5:
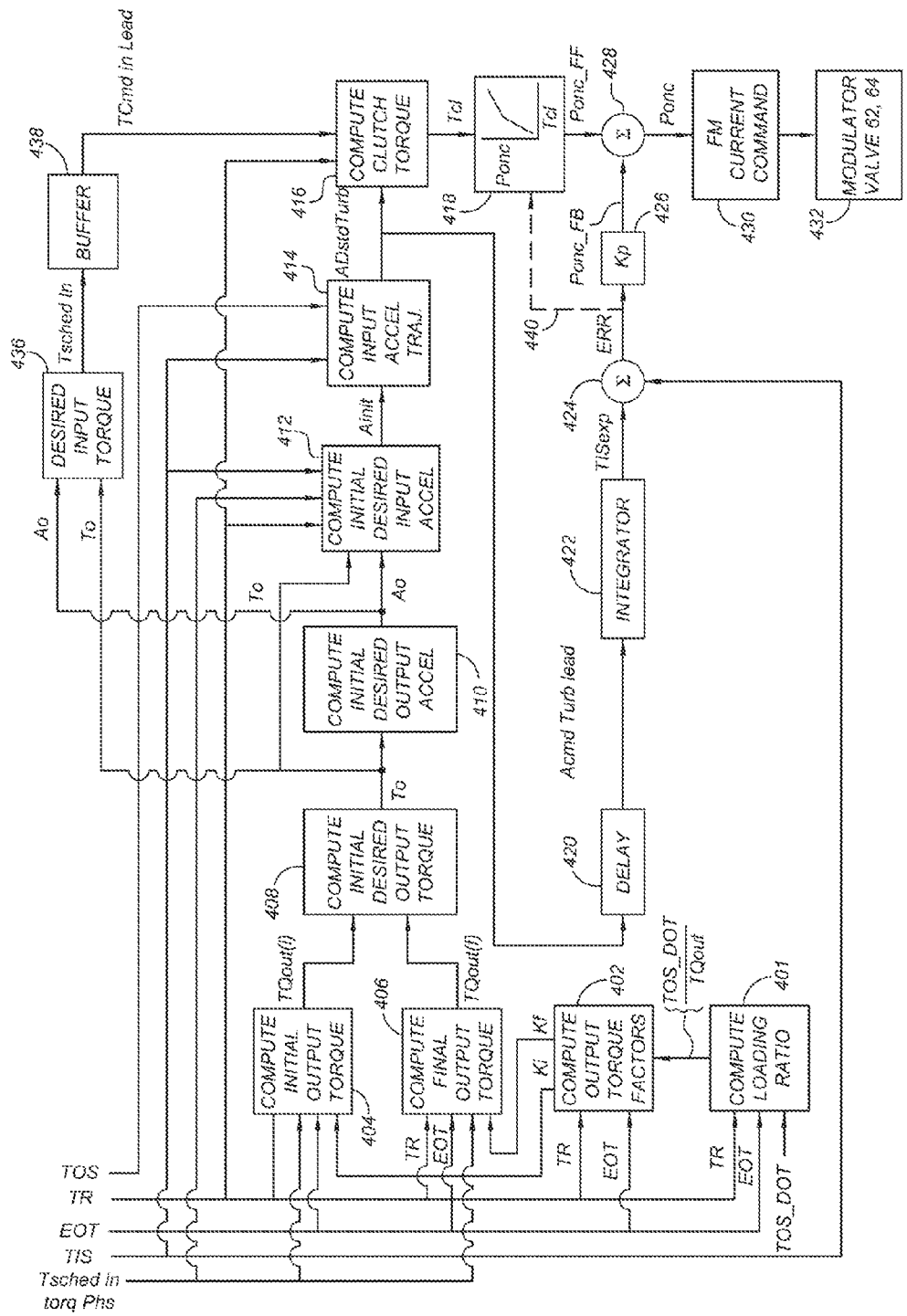
FIG. 5 is a graphical flow chart illustrating one embodiment of a portion of the method described in FIG. 3.

Referring next to FIG. 5, a representative or exemplary embodiment of the control strategy of steps 156 through 164 of FIG. 3 includes various blocks representing functions performed by the transmission control unit 66 (see FIG. 1). The inputs include the scheduled input torque ($T_{SchedInTorqPhs}$), engine output torque (EOT), i.e., the unmanaged torque value described above, the transmission input speed (TIS), the transmission output speed (TOS), and the torque ratio (TR) of the torque converter 16 (see FIG. 1). Various other inputs are derived from these inputs, such as the transmission output acceleration (TOS_DOT), the engine acceleration (ES_DOT), the torque converter speed ratio SR (i.e., TIS/engine speed), and the rate of change of the speed ratio SR (SR_DOT). The feed-forward control, represented by the blocks 401-418, produces a feed-forward pressure command Ponc_FF, and the feed-back control, represented by the blocks 420-426, produces a feed-back pressure command Ponc_FB. The feed-forward and feed-back pressure commands are then summed in the summer 428 to form the on-coming clutch pressure command Ponc. The pressure command Ponc, in turn, is applied as an input to the block 430, which develops a current command for the respective modulated valve 62, 64 (see FIG. 1).

Referring to the feed-forward control, the blocks 401 and 402 represent functions performed at the initiation of a shift command. The block 401 computes an estimate of the vehicle load and mass in terms of transmission output acceleration per unit transmission output torque, or (TOS_DOT/TQout). The output torque term TQout is computed prior to the initiation of shifting according to the equation:

$$T_{Qout} = (K1*TR*EOT) + (K2*TOS\_DOT) + (K3*TR*ES\_DOT)$$

where the constants K1, K2, and K3 are determined by calibration. The block 402 then computes torque scale factors Ki and Kf relating transmission output torque TQout to the transmission input torque TQin for the initial and final speed ratios involved in the shift. In other words, Ki defines the ratio TQout/TQin for the initial speed ratio, and Kf defines the ratio TQout/TQin for the final speed ratio. The torque scale factors Ki and Kf are nearly equal to the initial and final speed ratios of the transmission 14 of FIG. 1, respectively, with some variation due to the effects of engine and transmission inertia. The actual values of Ki and Kf may be computed using the equation:

$$TOS\_DOT = (A*TQin) + (B*TQout)$$

and setting TOS_DOT equal to the product of TQout and the determined ratio (TOS_DOT/TQout) to account for the load and mass effects.

Once the ratio (TOS_DOT/TQout) and the torque scale factors Ki, Kf have been determined, the blocks 404-412 determine the initial value Ainit of the acceleration trajectory for the shift. The blocks 404 and 406 compute output torque values TQout(i), TQout(f) for the initial and final speed ratios involved in the shift, using the equations:

$$TQout(i) = Ki*Ti$$

$$TQout(f) = Kf*Ti$$

Where Ti=$T_{SchedInTorqPhs}$ at the start of the inertia phase, ramping to Ti=TR*EOT by the expected end time of the inertia phase, i.e., at the point in time coinciding with the expected completed shift pull down. The block 408 then computes an initial value of the desired torque phase output torque To according to the equation: $T_O$=K[TQout(i)−TQout(f)]+TQout(f), where K is a calibration parameter. The block 410 then applies To to the ratio (TOS_DOT/TQout) to determine the initial value of the desired torque phase output acceleration, or $A_O$. Finally, the block 412 computes the initial input shaft acceleration (that is, Ainit) required to produce the desired initial output torque $T_O$ and the desired initial output acceleration $A_O$, given the scheduled torque value $T_{SchedInTorqPhs}$, engine speed, and torque converter parameters. The transmission input and output acceleration values TIS_DOT and TOS_DOT during a shift are modeled according to the equations:

$$TIS\_DOT = (a1*TQin) + (a2*TQcl) + (a3*TQout)$$

$$TOS\_DOT = (b1*TQin) + (B2*TQcl) + (B3*TQout)$$

where a1, a2, a3, b1, b2 and b3 are calibration constants, and TQcl is the torque capacity of the on-coming clutch, assuming an ideal transition between the on-coming and off-going clutches. Solving the model equations to eliminate TQcl, expressing TQin in terms of $T_{SchedInTorqPhs}$, engine speed ES, TIS_DOT, and the torque converter parameters SR and SR_DOT, and solving for TIS_DOT yields an expression for Ainit in terms of TO, AO, $T_{SchedInTorqPhs}$, engine speed, SR, SR_DOT, and calibration constants Ka-Ke, as follows:

$$A_{init} = [Ka*TR*(T_{SchedInTorqPhs} + Kb*ES*(SR\_DOT/SR)) + Kc*TQout + Kd*TOS\_DOT]/(1+Ke(TR/SR))$$

The initial desired acceleration Ainit is computed repeatedly during the fill phase of the shift to account for any changes in $T_{SchedInTorqPhs}$ and/or TOS_DOT, and a value of Ainit at the end of the fill phase is supplied as an input to block 414. The output of block 414 is the input acceleration trajectory ($A_{DstdTurb}$), and the trajectory value is maintained at Ainit until the input speed TIS begins to change toward the new speed ratio SRnew (that is, until the onset of the inertia phase of the shift). Thereafter, the block 414 repeatedly computes the trajectory $A_{DstdTurb}$ based on the computed slip speed SLIP of the on-coming clutch and the trajectory parameters Ainit, Afnl, Tinit, Tshift, and Tfinal. The slip speed SLIP at any time t is computed in accordance with the equation:

$$SLIP(t) = (TOS*SRnew) - TIS + [Atgt*(Tshift - t)]$$

where Atgt is the target acceleration of the transmission input shaft 18 (see FIG. 1) computed as the product $A_O*SRnew$) and Tshift is the selected duration of the inertia phase. The acceleration trajectory parameter Amax, in turn, is computed so that the area under the acceleration trajectory is equal to SLIP. The trajectory parameters, including Atgt, SLIP and Amax, are computed periodically during the shift to reflect any changes in the output acceleration $A_O$.

Block 416, which corresponds to step 164 of FIG. 3 described above, represents an inverse dynamic model of the transmission, and computes an on-coming clutch torque command that will satisfy the input acceleration trajectory $A_{CmdTurbLead}$ from block 420, given the scheduled torque value $T_{CmdInLead}$ and the torque converter characteristics. The basic model equations are the same as those given above in respect to block 412, but in this case, the equations are solved for the on-coming clutch torque TQcl, yielding:

$$TQcl = [K1 + K2(TR/SR)]A_{CmdTurbLead} + [K3*TR*T_{CmdInLead}] + [K4*TR*SR\_DOT*ES/SR]$$

where K1, K2, K3 and K4 are constants (including the mass/load ratio TOS_DOT/TQout). The clutch torque TQcl, in turn, is applied to block 418, which outputs the feed-forward pressure Ponc_FF. In the illustrated embodiment, the block 418 represents a look-up table of clutch pressure vs. clutch torque for the particular on-coming clutch, and comprises a discrete number of data points forming a piece-wise linear approximation of the pressure vs. torque relationship. As indicated by the broken line 440, the data points are subject to adaptive adjustment based on the closed-loop speed error, as a means of compensating for any modeling errors of block 416.

Referring to the feed-back control, the block 420 buffers or develops a delayed version ($A_{CmdTurbLead}$) of the input acceleration trajectory (see step 160 of FIG. 3), which is then integrated by the block 422 to form an expected input speed (TISexp), given the combined electrical and hydraulic delays in producing the commanded on-coming pressure Ponc. The delay period may be determined by calibration, and the acceleration trajectory $A_{DstdTurb}$ may be integrated using a conventional discrete trapezoidal integration technique, as represented by the equation:

$$TISexp(current) = TISexp(last) + T/2[TRAJ(current) + TRAJ(last)]$$

where TISexp(current) and TISexp(last) are the current and last values of the expected input speed, T is the update rate, and TRAJ(current) and TRAJ(last) are the current and last values of the input acceleration trajectory $A_{DstdTurb}$. The expected input speed so developed is then applied along with the measured input speed TIS to summer 424, forming an input speed error ERR. The block 426 applies a proportional gain term to ERR to form the feed-back pressure component Ponc_FB, which is combined with Ponc_FF as explained above.

In summary, the control of this invention uses an inverse dynamic model of the transmission to compute the on-coming clutch pressure required to achieve a desired input acceleration trajectory during the inertia phase of an upshift. The trajectory is delayed and integrated to determine the expected input speed response, which is compared with the measured input speed to form a closed-loop pressure correction that compensates for any modeling errors. The acceleration trajectory, in turn, is constructed so as to achieve a desired shift feel. The initial acceleration value Ainit is computed to achieve a desired output torque and acceleration, and the dynamic portion of the trajectory is computed to achieve a desired shift time and final output acceleration value. The shifting calibration effort is greatly simplified as compared with known open-loop controls, since the calibration parameters (shift time Tshift, for example) are well-defined and directly relate to observable characteristics of the shift. Any modeling errors of the feed-forward control are detected in the form of closed-loop error, and the control compensates for the errors through corresponding adjustment the feed-forward control—specifically, the data points of the clutch pressure vs. clutch torque transfer function table (block 418).

Referring to FIG. 4, a series of control trajectories or curves 200 describes a clutch control methodology according to the invention, i.e., as controlled via the method or algorithm 150 shown in FIG. 3 and described above. The turbine speed 208 (Nt) is depicted within the set of curves 200, peaking at a point indicated by arrow 210, and decreasing to a minimum value indicated by arrow 212. Line 204 represents the command of an upshift of the transmission 14 (see FIG. 1), i.e., a point in time at which a vehicle operator commands or otherwise signals for an upshift, as with line 104 of FIG. 2. Line 207/point 205 represents the time at which a clutch is filled or pressurized to a sufficient level for establishing a clutch pressure capable of "pulling down" or reducing a turbine speed (Nt) or curve 208, i.e., the speed of a turbine portion of the torque converter 16 (see FIG. 1), and to thereby initiate the upshift event that was previously commanded at line 204.

The distance or gap between the lines 204 and 207 represents a perceptible lag or delay in time between the actual command or signaling for an upshift, such as a gear shift or tap, and the initiation of the commanded shift event within transmission 14 (see FIG. 1), with the delay being abbreviated $\Delta t_2$ for simplicity. The turbine speed (Nt) or curve 208 peaks at a speed point approximately indicated by arrow 210, which corresponds approximately to the start point at which the actual upshift event begins. The turbine speed (Nt) or curve 208 then rapidly decreases to a minimum turbine speed point approximately indicated by arrow 212, representing an approximate end point for the commanded shift event initiated at the time indicated by line 207. In other words, the speed point indicated by arrow is the point in time at which a pressure corresponding to the on-coming clutch torque, represented by curve 202, ramps to a sufficient level for "pulling down" the calculated scheduled torque value (curve 206) (see step 152 of FIG. 3).

By using method 150 of the invention (see FIG. 3), engine torque is therefore reduced in a controlled manner using a calculated scheduled torque value rather than the unmanaged torque value, thus allowing initiation of an upshift at a lower relative engine speed. This in turn reduces the time delay required to initiate a commanded upshift, i.e., the original $\Delta t_1$ of FIG. 2 to the reduced $\Delta t_2$ of FIG. 4.

While the best modes for carrying out the invention have been described in detail, those familiar with the art to which this invention relates will recognize various alternative designs and embodiments for practicing the invention within the scope of the appended claims.

The invention claimed is:

1. A method for reducing a time delay between a commanded upshift event and the initiation of the inertia phase of the commanded upshift event in a vehicle having an engine with an unmanaged torque value and an automatic transmission, the method comprising:
   detecting the commanded upshift;
   calculating a scheduled torque value as a function of the unmanaged torque value of the engine in response to the commanded upshift; and
   reducing an input torque value from the engine, prior to completing the torque phase of the upshift event and before entering the inertia phase, to achieve a predetermined speed of the engine using the calculated scheduled torque value, thereby enabling the commanded upshift event to commence at the predetermined speed of the engine at the start of the inertia phase.

2. The method of claim 1, wherein the vehicle includes a torque converter having a turbine portion, the method further comprising:
   measuring a speed of a turbine portion of the torque converter;
   determining, prior to entering the inertia phase, a target percentage level of torque reduction of the engine torque; and
   determining a target time by which to achieve the target percentage level of torque reduction;
   wherein the function of unmanaged torque value also includes the speed of the turbine portion of the torque converter, the target percentage level of torque reduction, and the target time.

3. The method of claim 2, wherein determining the target percentage of torque reduction and the target time includes accessing a lookup table that is indexed by the speed of the turbine portion and the unmanaged torque value.

4. The method of claim 1, wherein the vehicle includes a torque converter having a turbine portion, the method further comprising:
   measuring an input acceleration trajectory of the turbine portion of the torque converter at the start of the torque phase of the upshift event;
   calculating an output torque trajectory of an output shaft of the automatic transmission;
   calculating an on-coming torque level of the on-coming clutch required for controlling the on-coming clutch during the torque phase using the scheduled torque value; and
   calculating an off-going torque level of the off-going clutch required for controlling the off-going clutch during the torque phase using the scheduled torque value;
   wherein the on-coming and off-going torque levels are calculated using an equation that is a function of the scheduled torque value, the output torque trajectory of the automatic transmission, and the measured acceleration of the turbine portion of the torque converter.

5. The method of claim 4, further comprising:
   calculating an output acceleration trajectory of the turbine portion of the torque converter at the completion of the torque phase of the upshift event, the output acceleration trajectory describing a required turbine acceleration trajectory for the inertia phase;
   calculating a desired turbine acceleration trajectory representing the desired turbine acceleration trajectory for the entire speed ratio change of the upshift event; and
   calculating a desired engine torque that is required through a speed ratio change of the upshift event;
   wherein calculating a desired engine torque is a function of the output torque trajectory, the desired turbine acceleration trajectory, and the output acceleration trajectory.

6. The method of claim 5, further comprising buffering the desired engine torque and the desired turbine acceleration trajectory to compensate for a predetermined time lag representing a known delay in delivering an input torque from the automatic transmission to the clutch assembly.

7. A method for reducing a time delay between a commanded upshift and a resultant upshift event in a vehicle having an engine with an unmanaged torque value, an automatic transmission, a torque converter, an off-going clutch, and an on-coming clutch, the method comprising:
   detecting a commanded speed ratio change corresponding to an upshift event;
   calculating a scheduled engine reduction torque value as a percentage reduction of the unmanaged torque level of the engine in response to the commanded speed ratio change;
   calculating an on-coming torque value for the on-coming clutch and an off-going torque value for the off-going clutch during a torque phase of the upshift event using the scheduled engine reduction torque;
   reducing an input torque value from the engine using the scheduled engine reduction torque value, prior to completing the torque phase and before entering an inertia phase of the shift event, to achieve a predetermined speed of the engine prior to entering the inertia phase; and
   controlling the on-coming clutch and the off-going clutch during the torque phase using the respective calculated on-coming and off-going torque values.

8. The method of claim 7, wherein calculating a scheduled engine reduction torque value includes:
   accessing a lookup table to thereby determine a target percentage torque reduction of the engine;
   accessing the lookup table to thereby determine a target time to achieve the target percentage torque reduction;
   determining an unmanaged torque value of the engine; and
   measuring a speed of a turbine portion of the torque converter;
   wherein the lookup table is indexed by the speed of the turbine portion and the unmanaged torque value.

9. The method of claim 8, further comprising:
   measuring a final turbine acceleration trajectory of a turbine portion of the torque converter at the completion of a torque phase of the upshift event; and
   calculating a scheduled input torque during an inertia phase of the upshift event using the calculated scheduled engine reduction torque and the measured final turbine acceleration.

10. The method of claim 9, further comprising:

determining a desired turbine acceleration profile through the speed ratio change of the turbine portion of the torque converter; and buffering the desired acceleration profile to compensate for a predetermined time lag for delivering an input torque from the transmission to the on-coming clutch.

11. The method of claim 10, further comprising:

comparing the calculated scheduled engine reduction torque to the scheduled input torque;

selecting the lesser value of the scheduled engine reduction torque and the scheduled input torque;

adjusting the lesser value according to a torque ratio of the torque converter; and reducing an input torque from the engine to achieve the lesser of the scheduled engine reduction torque and the scheduled input torque.

12. A vehicle powertain comprising:

an engine having an unmanaged torque level;

a transmission having an input shaft;

a torque converter providing a fluid coupling between the engine and the transmission input shaft;

an on-coming clutch and an off-going clutch that are selectively engageable to provide at least six forward speed ratios, a reverse speed ratio, and a neutral condition; and a controller having an algorithm configured for controlling an operation of the off-going clutch and of the on-coming clutch during a speed ratio change representing an upshift event;

wherein the controller is configured to execute the algorithm to thereby:

detect a commanded speed ratio change of the transmission;

calculate a scheduled engine torque value as a function of the unmanaged torque level of the engine prior to entering or concurrently with a torque phase of the shift event; and reduce the speed of the engine using the scheduled engine torque value prior to entering the inertia phase of the shift event to thereby minimize a delay between detection of the commanded speed ratio change and entry into the inertia phase of the upshift event.

13. The vehicle powertrain of claim 12, wherein the on-coming clutch and the off-going clutch are selected from a plurality of clutches consisting of at least a first, a second, a third, a fourth, and a fifth clutch.

14. The vehicle powertrain of claim 12, wherein the algorithm is configured for calculating the scheduled torque value by determining a target percentage level of torque reduction from the engine and a target time by which to achieve the target percentage of torque reduction.

* * * * *